United States Patent [19]
Côté et al.

[11] Patent Number: 5,900,753
[45] Date of Patent: May 4, 1999

[54] ASYNCHRONOUS INTERFACE

[75] Inventors: Jean-Francois Côté ; Benoit Nadeau-Dostie, both of Aylmer, Canada

[73] Assignee: LogicVision, Inc., San Jose, Calif.

[21] Appl. No.: 08/825,446

[22] Filed: Mar. 28, 1997

[51] Int. Cl.$^6$ .................................................. H03L 7/00
[52] U.S. Cl. ..................... 327/145; 327/144; 375/359; 371/22.1; 371/22.5; 371/22.36
[58] Field of Search ................................. 327/144, 145, 327/151, 99, 160; 371/22.1, 55, 22.5, 22.36; 375/354, 355, 359, 362; 395/551

[56] References Cited

U.S. PATENT DOCUMENTS

| | | | |
|---|---|---|---|
| 5,048,021 | 9/1991 | Jarwala et al. ........................ | 371/22.3 |
| 5,396,498 | 3/1995 | Lestrat et al. ........................... | 371/3 |
| 5,627,842 | 5/1997 | Brown et al. ........................... | 371/22.3 |
| 5,673,276 | 9/1997 | Jarwala et al. ......................... | 371/22.3 |
| 5,677,915 | 10/1997 | Whetsel ................................. | 371/22.3 |
| 5,701,308 | 12/1997 | Attaway et al. ....................... | 371/22.3 |
| 5,717,702 | 2/1998 | Stokes et al. ......................... | 371/22.35 |

*Primary Examiner*—Timothy P. Callahan
*Assistant Examiner*—Jung Ho Kim
*Attorney, Agent, or Firm*—Skjerven, Morrill, MacPherson, Franklin & Friel LLP

[57] ABSTRACT

An interface allowing to transfer serial test data from a Test Access Port (TAP) to controllers located in several clock domains is described. The clock frequencies can be different from each other and do not need to be related in phase to each other or with the clock of the TAP. The interface is proven to work reliably as long as the clock frequencies used for the test controllers and registers is 3 times higher than the one of the TAP used to source the serial test data.

67 Claims, 8 Drawing Sheets

ASYNCHRONOUS INTERFACE

FIELD OF THE INVENTION

The present invention relates to interfacing test access ports to test controllers and is particularly concerned with handling different clock domains.

BACKGROUND TO THE INVENTION

It is well known to provide a test access port for testing an integrated circuit. A typical circuit includes a test access port (TAP) for example one complying with the IEEE 1149.1 Standard. As the TAP and the module likely use different clocks, an interface is required. The TAP signals shown correspond to the ones used by the IEEE 1149.1 standard. The TAP allows initializing and collecting of the results of the test controller during system maintenance. Signals can be exchanged directly between the test controller and the rest of the module to be tested because they are part of the same clock domain. High-speed testing of the module is therefore possible. However, a special interface between the TAP and the test controller must be designed to enable the exchange of signals.

In the prior art, there are at least 2 ways suggested to make this data transfer possible. The first one is to intercept the clock of the module under test with a multiplexer and substitute it with the TAP clock during the transfer of the serial data. Once the data has been loaded in the registers, they are configured in a holding mode and the module clock is switched back to the original clock frequency. The holding mode is necessary to make sure that the registers keep the value they were programmed to while the clocks are switched since unintended clock pulses are likely to occur at that time because of the unknown phase relationship between the clocks in most systems. This method is attractive due to its relatively low cost as it requires only one additional multiplexer per flip-flop in the test controller to implement the holding mode. However, it is necessary to interrupt the normal system function while the data transfer takes place. This is not always desirable since some of the test functions require the system to be running normally. Another disadvantage is that in many high-speed applications, a phase-lock loop (PLL) is used to compensate phase differences between the input and output of the circuit. The PLL may take a long time to resynchronize after it has been disabled for the duration of the serial data transfer. Finally, the glitches generated on the clock lines may cause the simulation of the circuit to fail due to the pessimistic assumptions made in the models and the simulators themselves.

A second method is to use "shadow" registers, that is to duplicate all flip-flops of the test controller and connect their clock to the clock of the TAP. To initialize the test controller, data is first shifted in the shadow register. When all the data has been shifted in, the register is put in a holding mode similar to the one described above or the TAP clock is stopped. A signal from the TAP indicating that the data is ready to be transferred is sent to the test controller which resynchronizes it by sampling it with 2 consecutive flip-flops. The synchronized signal is then distributed to all flip-flops of the test controller that can then safely load the data in the shadow register. A similar process is used to send data back to the TAP. The advantage of this method compared to the first one is that the system clock does not need to be interrupted during the initialization and reading of the test registers. The main drawback of this method is its relatively high cost because of the duplication of all the registers of the test controller.

SUMMARY OF THE INVENTION

An object of the present invention is to provide an improved asynchronous interface for a test access port.

In accordance with an aspect of the present invention there is provided an asynchronous interface for interfacing a test access port in one clock domain to a test controller in a second clock domain comprising inputs for receiving a hold signal, a shift signal, a test clock signal and serial data in signal from the test access pod and a system clock signal, outputs for providing a synchronized hold signal, a synchronized shift signal and serial data out signal to the test controller, a first circuit connected to the inputs for receiving test clock and system clock signals for deriving a synchronization pulse therefrom, a second circuit connected to the hold signal input and the output of the first circuit for deriving therefrom a synchronized hold signal and connected to the synchronized hold signal output, a third circuit connected to the input for the shift signal and the output of the first circuit for deriving therefrom a synchronized shift signal and connected to the output for providing a synchronized shift signal and a fourth circuit connected to the input for serial data in, the output for serial data out and the test clock signal for retiming serial data from the test access port.

The method described herein allows transfer of serial test data originating from a Test Access Port (TAP) to test controllers or registers distributed over several clock domains. The transfer of the data can be performed reliably despite the fact that the clock frequency used by the modules under test can be different and do not need to be related in phase i.e. that the relative placement of the clock edges are unknown and can vary in time. The only assumption made about the frequency of the clock of the TAP with respect to the other clocks is that it is at least 3 times slower than any of the other clocks connected to the test controllers and registers. Having the test controllers and registers connected directly to the same clock domain as the module under test allows reliable testing at high speed by avoiding clock skew problems. The method and circuit is illustrated here for a Test Access Port complying with the IEEE 1149.1 standard but can be applied to any other serial TAP whose signals can be synchronized as shown.

Advantages of the present invention are its low hardware cost, its robust timing, its compatibility with existing standards, design practices and design tools.

BRIEF DESCRIPTION OF THE DRAWINGS

The invention will be further understood from the following detailed description of embodiments of the present invention with reference to the accompanying drawings in which.

DETAILED DESCRIPTION

Figure 1:
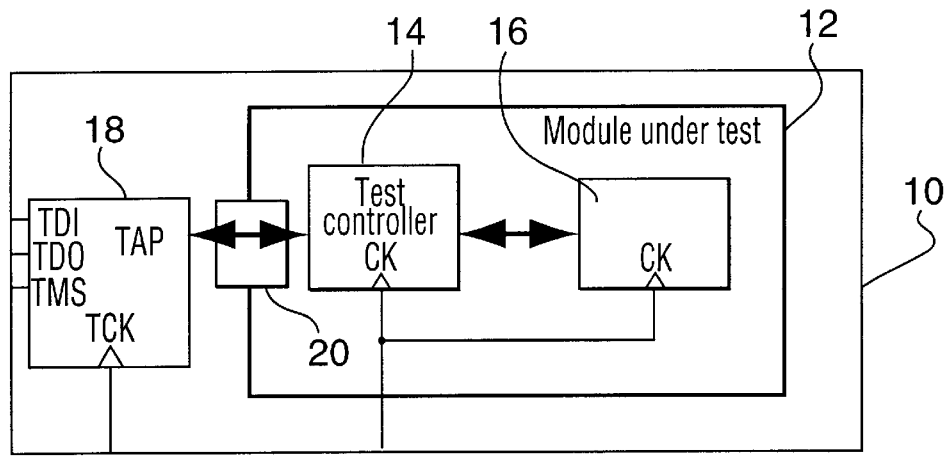
FIG. 1 illustrates, in a block diagram, a typical circuit with a test access port.

Referring to FIG. 1, there is illustrated, in a block diagram, a typical circuit with a test access port. The circuit 10 includes a module 12 having a test controller 14 and remaining circuitry of module under test 16. The circuit includes a test access port (TAP) 18 for example one complying with the IEEE 1149.1 Standard. As the TAP 18 and the module 17 likely use different clocks, an interface 20 is required. The TAP signals shown correspond to the ones used by the IEEE 1149.1 standard. The TAP allows initializing and collecting of the results of the test controller during system maintenance. Signals can be exchanged directly between the test controller and the rest of the module to be tested because they are part of the same clock domain. High-speed testing of the module is therefore possible. However, a special interface between the TAP and the test controller must be designed to enable the exchange of signals.

In the prior art, there are at least 2 ways suggested to make this data transfer possible. The first one is to intercept the clock of the module under test with a multiplexer and substitute it with the TAP clock, during the transfer of the serial data. Once the data has been loaded in the registers, they are configured in a holding mode and the module clock is switched back to the original clock frequency. The holding mode is necessary to make sure that the registers keep the value they were programmed to while the clocks are switched since unintended clock pulses are likely to occur at that time because of the unknown phase relationship between the clocks in most systems. Retiming elements similar to the ones shown in FIG. 3b, are used to neutralize the clock skew between the two clock domains. This method is attractive due to its relatively low cost as it requires only one additional multiplexer per flip-flop in the test controller to implement the holding mode. However, it is necessary to interrupt the normal system function while the data transfer takes place. This is not always desirable since some of the test functions require the system to be running normally. Another disadvantage is that in many high-speed applications, a phase-lock loop (PLL) is used to compensate phase differences between the input and output of the circuit. The PLL may take a long time to resynchronize after it has been disabled for the duration of the serial data transfer. Finally, the glitches generated on the clock lines may cause the simulation of the circuit to fail due to the pessimistic assumptions made in the models and the simulators themselves.

A second method is to use "shadow" registers, that is to duplicate all flip-flops of the test controller and connect their clock to the clock of the TAP. To initialize the test controller, data is first shifted in the shadow register. When all the data has been shifted in, the register is put in a holding mode similar to the one described above or the TAP clock is stopped. A signal from the TAP indicating that the data is ready to be transferred is sent to the test controller which resynchronizes it by sampling it with two consecutive flip-flops. The synchronized signal is then distributed to all flip-flops of the test controller that can then safely load the data in the shadow register. A similar process is used to send data back to the TAP. The advantage of this method compared to the first one is that the system clock does not need to be interrupted during the initialization and reading of the test registers. The main drawback of this method is its relatively high cost because of the duplication of all the registers of the test controller.

Figure 2:
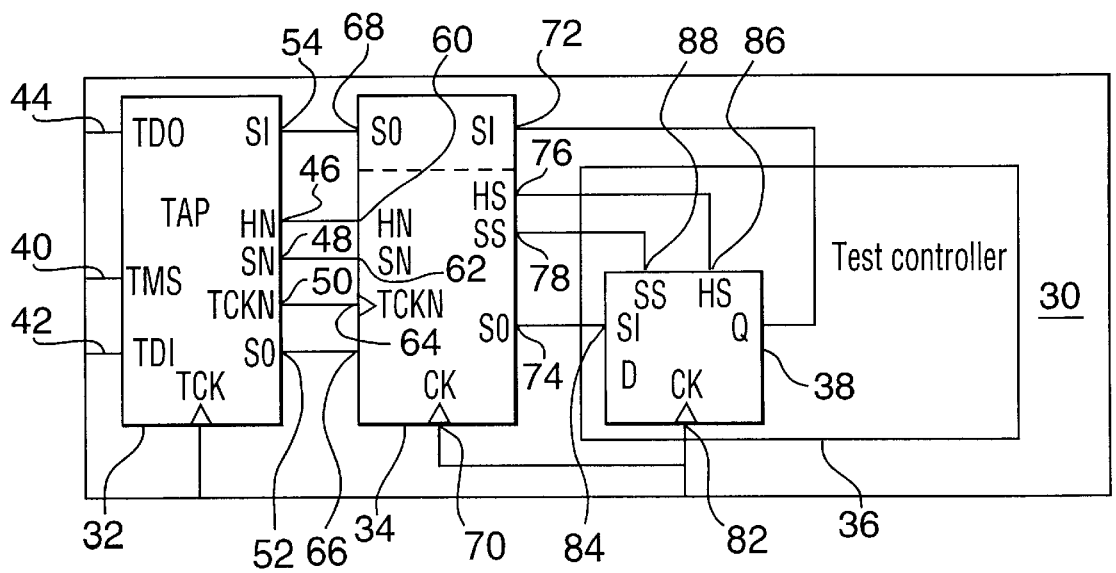
FIG. 2 illustrates a circuit having an asynchronous interface in accordance with an embodiment of the present invention.

Referring to FIG. 2, there is illustrated a circuit having an asynchronous interface in accordance with an embodiment of the present invention. The circuit 30 includes a TAP 32, an asynchronous interface 34 and a test controller 36. The test controller 36 includes register 38.

The TAP 32 includes inputs for a test mode signal (TMS) 40 and test data (TDI) 42 and an output for test data (TDO) 44 as required by the IEEE standard. The TAP 32 also includes outputs for asynchronous hold (HN) 46 and asynchronous shift (SN) 48, inverted test clock (TCKN) 50 and serial data (SO) 52 and an input for serial data (SI) 54.

The asynchronous interface 34 includes corresponding inputs for HN 60, SN 62, TCKN 64, and Sl 66 and output SO 68. The asynchronous interface 34 also includes inputs for system clock CK 70 and serial data (SI) 72 and outputs for serial data (SO) 74, HOLD_SYNC (HS) 76 and SHIFT_SYNC (SS) 78.

The test controller 36 includes register 38 having inputs for system clock (CK) 82, serial data (SI) 84, HS 86 and SS 88.

Before explaining the operation of the circuit of FIG. 2, it is necessary to describe the subcircuits used in the TAP 32, the asynchronous interface 34 and the register 38.

Figure 3A:
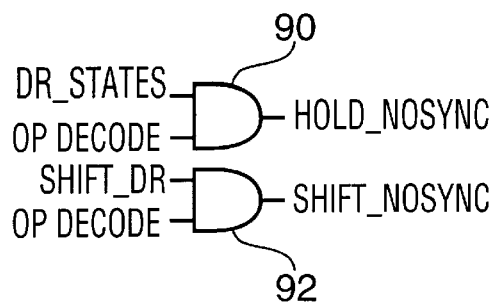
FIGS. 3a and 3b schematically illustrate subcircuits in the circuit of FIG. 2 for generating TAP signals and for retiming serial data, respectively.
Figure 3B:
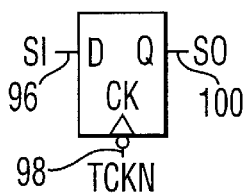

Referring to FIGS. 3a and 3b, there are schematically illustrated subcircuits in the circuit of FIG. 2 for generating TAP signals and for retiming serial data, respectively. The asynchronous hold (HN) signal and the asynchronous shift (SN) signal are derived by ANDing DR_STATES with OP DECODE and SHIFT_DR with OP DECODE, respectively in AND gates 90 and 92, respectively, as shown in FIG. 3a. The serial data input Sl 96 is retimed by the TAP clock signal TCKN through inverted clock input 98 and serial data output SO 100.

Figure 4:
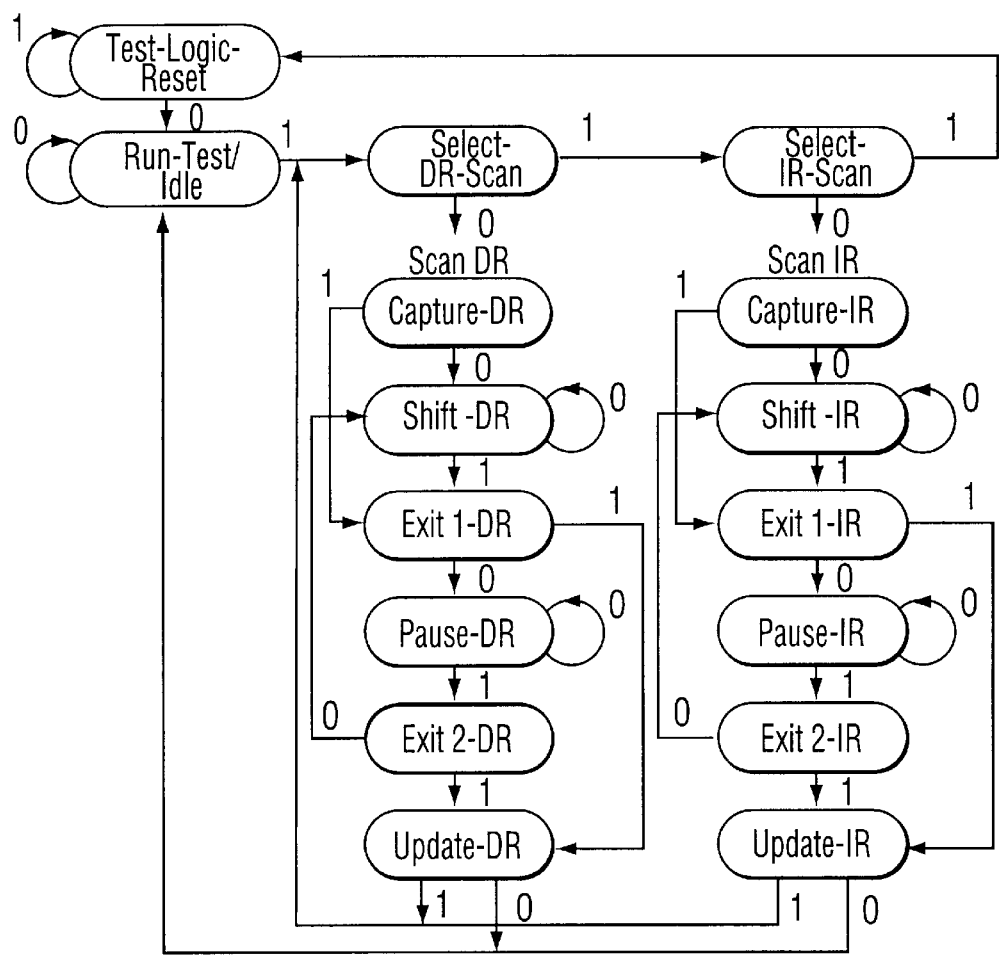
FIG. 4 illustrates a state diagram for the TAP of FIG. 2.

Referring to FIG. 4, there is illustrated a state diagram for the TAP of FIG. 2. When using an IEEE 1149.1 compliant TAP, there are times at which the serial data stream is interrupted. These times are associated with states of the TAP shown in FIG. 4. For example, during the states EXIT1_DR, PAUSE_DR, EXIT2_DR, UPDATE_DR, there is no new serial data to shift into the test registers. During those states, the test registers should not be clocked. However, because the clock of the test registers is actually free running, the TAP generates an extra control signal (HN) that indicates when the test register should hold its current value because no new data bit is available from the TAP. Note that for the purpose of this embodiment of the present invention, the SHIFT_DR state is also included in the list of states that cause the test register to hold its data. This is because the system clock frequency is higher than the one of the TAP clock. The test register must only shift by one position for each clock cycle of the TAP during the SHIFT_DR cycle. It must hold otherwise even if the TAP is still in the SHIFT_DR state.

Figure 5:
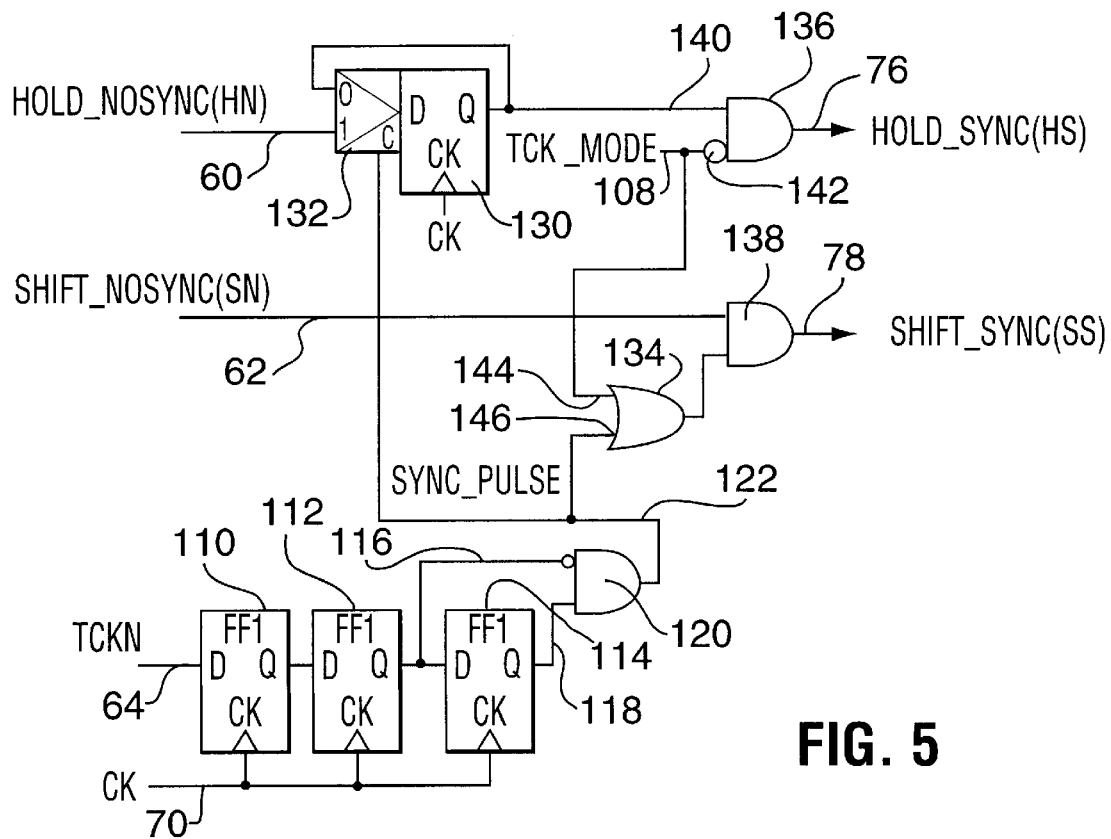
FIG. 5 schematically illustrates a state machine for the asynchronous interface of FIG. 2.

Referring to FIG. 5, there is schematically illustrated a state machine for the asynchronous interface of FIG. 2. The state machine includes inputs for HN 60, SN 62, TCKN 64, CK 70, and TCK_MODE 108 and outputs for HS 76 and SS 78 of the asynchronous interface 34. Three D-type flip-flops 110, 112, and 114 are connected in series with the TCKN input 64 connected to the data 'D' input of the first flip-flop 110 and the CK input connected to the 'CK' inputs of all three flip-flops 110, 112, and 114. The 'Q' outputs of the flip-flops 112 and 114 are applied to inputs 116 and 118 of an AND gate 120 with the input 116 inverted. The output 122 of AND gate 120 provides a synchronization pulse to the remaining elements of the state machine. These elements include a D-type flip-flop 130 with input multiplexer (MUX) 132, an OR gate 134 and AND gates 136 and 138. The HN input 60 is connected to the '1' input of input MUX 132. The sync pulse output 122 of AND gate 120 is connected to the control input of input MUX 132. The 'Q' output of D flip-flop 130 is connected to the '0' input of input MUX 132 and to an input 140 of AND gate 136. The TCK_MODE input 108 is connected to an inverted input 142 of AND gate 136 and an input 144 of OR gate 134. The output of AND gate 136 is connected to the HOLD_SYNC (HS) output 76.

The TCK_MODE input 108 is connected to one input 144 of OR gate 134, the sync pulse output 122 is connected to the other input 146 of OR gate 134. The output of OR gate 134 is applied as input to the AND gate 138 whose output is connected to the SHIFT_SYNC SS output 78.

The key element of the circuit is the generation of the SYNC_PULSE. Since the phase relationship of TCKN and CK is not known, it is necessary to sample TCKN using two consecutive flip-flops 110 and 112, to avoid a malfunction of the interface when flip-flop 110 enters a metastable (or unstable) state. By contrast to flip-flop 110, flip-flop 112 output is guaranteed to always have a definite value (0 or 1) that will lead to consistent decoding of its output. The output of flip-flops 112 and 114 is used to detect a falling edge (that is a transition from 1 to 0) on the inverted TAP clock (TCKN). It is very important to use the clock used to control the registers generating the HN and SN signals that must be resynchronized. On a falling edge of TCKN, some or all of the input signals to the asynchronous interface (HN, SN) or the SO output may have changed. A SYNC_PULSE is generated to sample the value HN, SN and possibly SO, if SS becomes a 1. If this particular test register is not selected to transfer serial test data (OP_DECODE=0), the HN and SN signals will be held low meaning that the test register is neither holding nor shifting under the control of the TAP, possibly performing its test function or simply disabled.

In the present embodiment of the asynchronous interface, a mode input (TCK_MODE) has been added that allows bypassing of the asynchronous interface. In this mode, used for manufacturing, it is possible to apply the same frequency with known phase relationship to all clock inputs. In this mode, HS is held low (inactive) and SS simply follows SN coming directly from the TAP. This mode is used mainly for diagnostic purposes.

Figure 6A:
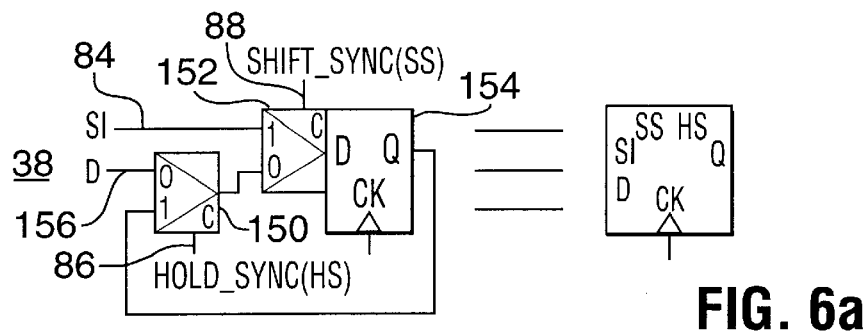
FIGS. 6a and 6b schematically illustrate a register and an alternative register for the test controller of FIG. 2.
Figure 6B:
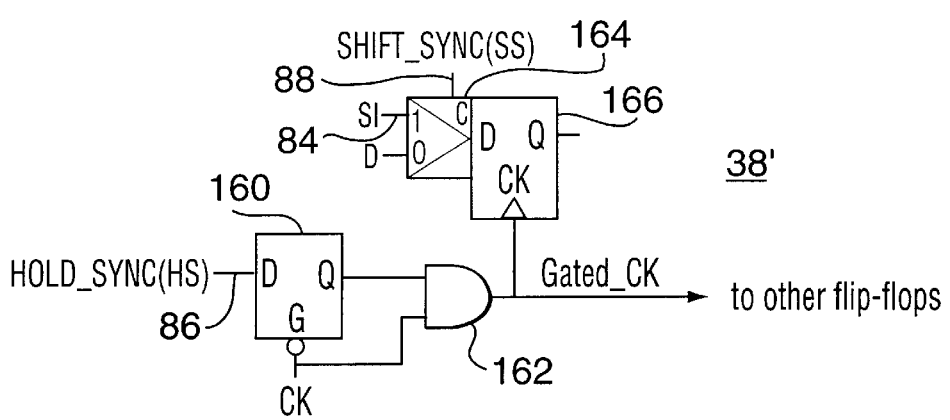

Referring to FIGS. 6a and 6b there are schematically illustrated a register and an alternative register for the test controller of FIG. 2. The register 38 of FIG. 6a includes a first multiplexer (MUX) 150, a second multiplexer (MUX) 152 and a D flip-flop 154. The first MUX 150 has a D input 156 connected to its '0' input and the HOLD_SYNC (HS) input 86 connected to its control 'C' input. The output of the first MUX 150 is connected to the '0' input of the second MUX 152. The second MUX 152 has the data input Sl 84 connected to its '1' input and the SHIFT_SYNC SS input 88 connected to its control 'C' input. The output of second MUX 152 is connected to the 'D' input of flip-flop 154 whose 'Q' output is connected to the '1' input of first MUX 150. The clock input is connected to system clock CK.

In FIG. 6a, the flip-flops of the test registers are constructed to support an embodiment of the present invention. In addition to the multiplexer implementing the shift mode of the register, MUX 152, another multiplexer is required to hold data in the register, MUX 150. This is necessary to account for the difference in the frequency of operation of the TAP 30 and the test register 38. For example, if the frequency of the system clock is 3 times higher than the clock of the TAP, the register must be controlled so that it is placed in the shift mode for one clock cycle and in the hold mode for 2 clock cycles, waiting the next serial bit to be transmitted from the TAP. The number of hold cycles will fluctuate slightly for each bit transmitted when the frequency ratio between the test clock and the TAP clock is not an integer.

FIG. 6b provides an alternative arrangement for the registers 38 of test controller 36. The register 38' includes a transparent latch 160, an AND gate 162, a MUX 164, and a flip-flop 166. The HOLD_SYNC (HS) input 86 is connected to the 'D' input of transparent latch 160. The SHIFT_SYNC (SS) input 88 is connected to the control input of MUX 164. The output of AND gate 162, a gated system clock signal, is applied as input to the clock input 'CK' of flip-flop 166 and other flip-flops in the test controller (not shown in the figures). Hence, instead of building the flip-flops with an additional multiplexer to implement the hold mode, it is possible to simply suppress the clock CK using the signal HS as shown in FIG. 6b. This gating can be performed locally for a single flipflop or a group of flip-flops. However, extra care must be taken to insure that the clock skew introduced on the clock signal does not affect the correct functioning of the test register.

Figure 7:
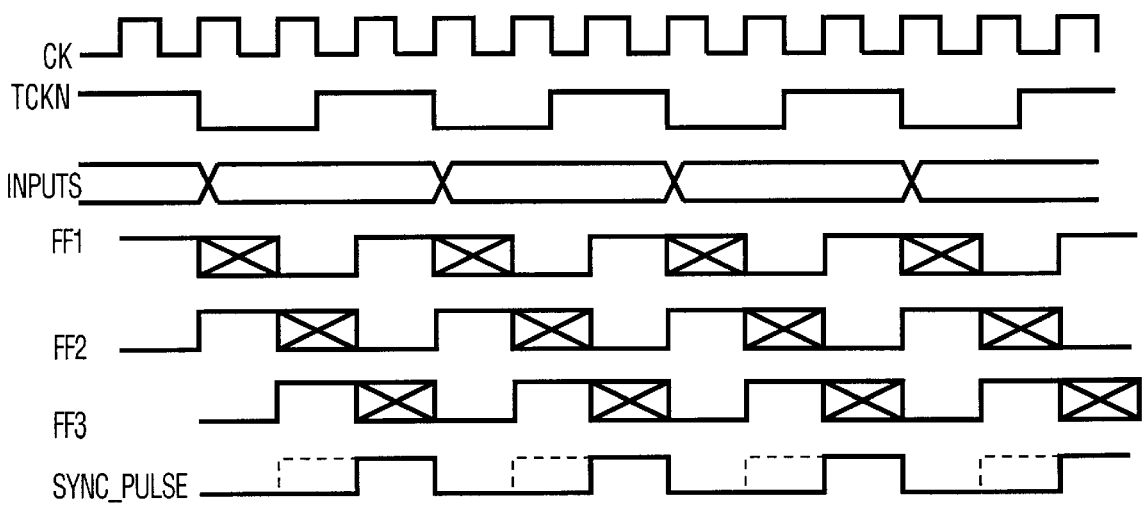
FIG. 7 graphically illustrates a timing diagram for the main signals of the asynchronous interface of FIG. 2.

Referring to FIG. 7 there is graphically illustrated a timing diagram for the main signals of the asynchronous interface of FIG. 2. The case shown is for a ratio of frequency $f_{CK}/f_{TCKN}$ equal to 3. This is the minimum frequency ratio at which the asynchronous interface will operate correctly. For each falling edge of TCKN, one (and only one) SYNC_PULSE must be generated to sample the HN and SN inputs as well as SO when a shift operation is required. In the example shown, an added difficulty is that CK is exactly in phase with TCKN such that a rising edge of CK occurs exactly at the same time as the falling edge of TCKN. This is why the state of flip-flop 110 is unknown at certain times. Flip-flops require the input signal to be stable for a minimum period of time before ($t_{setup}$) and after ($t_{hold}$) the active clock edge. TCKN changes state during this period causing the state of flip-flop 110 to be unknown or even unstable. Flip-flop 112 will sample this unknown value and resolve the metastable state if necessary. This resolved value is subsequently captured by flip-flop 114. The fact that the same unknown value is captured by flip-flops 112 and 114 is important and is flagged by identifying the unknown values by a number.

In the present example, if unknown value is 1, the SYNC_PULSE is generated just in time to capture the inputs. This pulse is drawn with a solid line. For the flip-flops of the test register, the minimum hold time guaranteed for the test registers is $t_{hold\_tr} = t_{TCKN \rightarrow INPUTS}$ which is the time it takes the inputs of the asynchronous interface to change subsequent to a falling of TCKN. This is sufficient to operate the register safely when the flip-flops clocked by both TCKN and CK are designed in the same process technology.

If, instead, the unknown value is 0, the SYNC_PULSE is generated one clock period before. The pulse is drawn with a dotted line in this case. In this case, the hold time guaranteed for the test registers approaches the full clock period of CK ($t_{period\_CK}$) which is of course more than necessary.

The particular case where the clock frequency is exactly 3 causes the phase between CK and TCKN to be constant and one does not need an asynchronous interface to handle it. However, as soon as the frequency ratio is slightly higher than 3, even infinitesimally, the situation changes drastically. For example, if the frequency ratio is 3.01, essentially the same waveforms as the ones shown in FIG. 7 would be seen but CK would slowly drift with respect to TCKN over time changing the relative phase between the signals. This can be visualized by sliding CK with respect to TCKN and recalculating the other waveforms accordingly. It can be seen that the hold time for the test register will vary linearly between $t_{TCKN\to INPUTS}$ and ($t_{period\_CK}$).

As the frequency ratio is increased, the SYNC_PULSE is generated sooner after the falling edge of TCKN, providing more and more hold time margin for the test register, but reducing its setup time margin. If the frequency ratio is such that $(2*t_{period\_CK-tsetup\_tr}) < t_{TCKN\to INPUTS}$, the setup time for the test register becomes insufficient and the circuit does not work properly. When the flip-flops clocked by TCKN and CK are built from a same technology, this is clearly not an issue. It can only be an issue when interfacing registers built of different process technologies. For example, CMOS and bipolar technologies could be present on a same chip. However, the proposed asynchronous interface will work for most practical values of frequency ratios even in the case of mixed process technologies making it the preferred method to interface test registers.

Another detail concerning the timing is the immunity of this interface to clock jitter. Clock jitter is the small and rapid variation of the clock frequencies. However, the clock jitter should not cause the frequency ratio to go below 3 when calculated over a period of TCKN.

Figure 8:
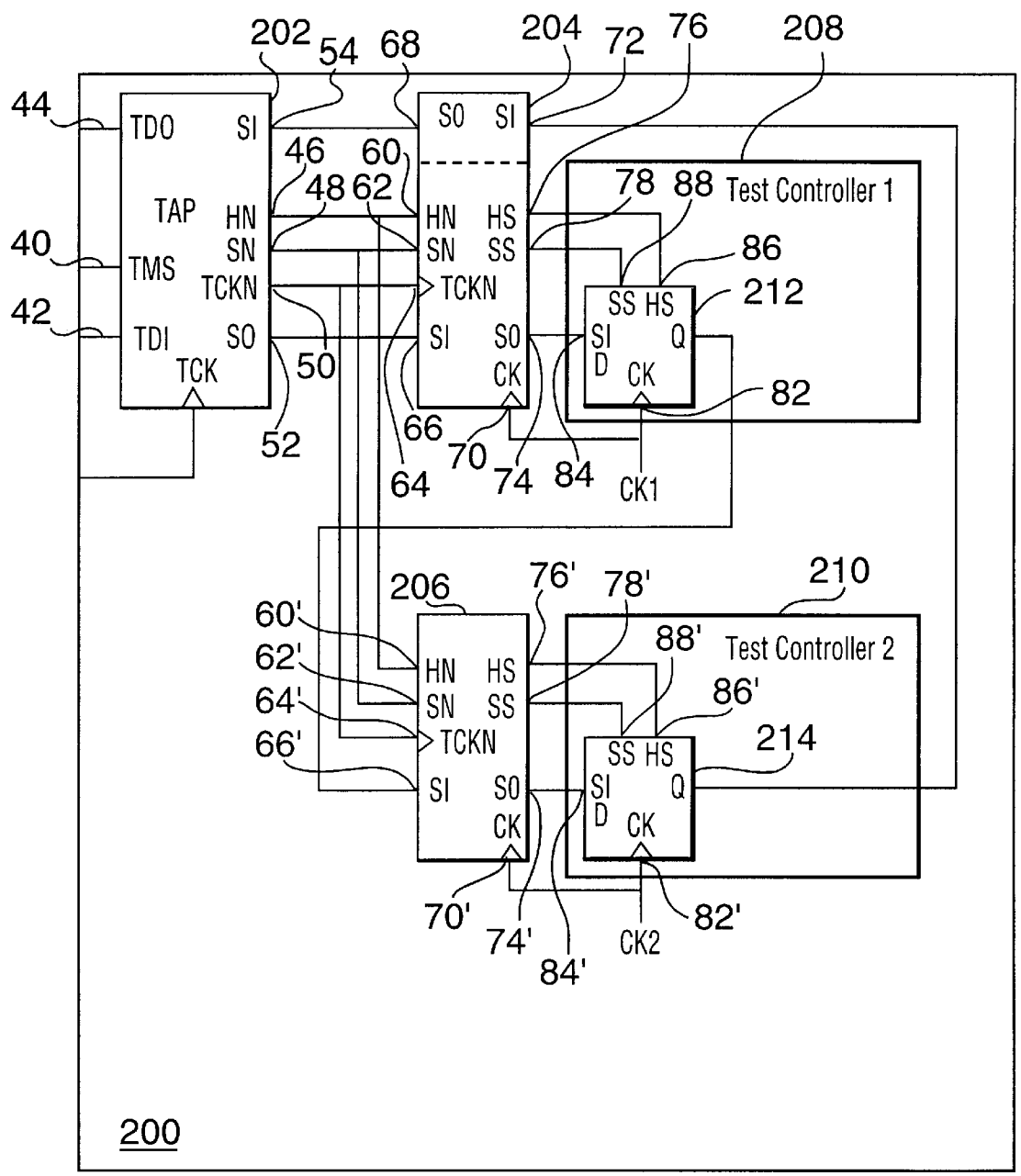
FIG. 8 illustrates in a block diagram an interface in accordance with another embodiment of the present invention for interfacing a circuit with two test controllers having different clocks.

FIG. 8 illustrates in a block diagram an interface in accordance with another embodiment of the present invention for interfacing a circuit with two test controllers having different clocks. The embodiment of FIG. 2, dealt with the interface of the clock domain driven by the inverse of the TAP clock, TCKN, and another clock domain driven by a system clock at least 3 times faster than the TAP clock. However, the asynchronous interface allows interfacing with several system frequency domains that must be traversed by the serial data test bus. An asynchronous interface is required for each frequency domain as shown in FIG. 8. The circuit 200 includes a TAP 202, asynchronous interfaces 204 and 206 and test controllers 208 and 210. Test controllers 208 and 210 include registers 212 and 214, respectively.

The TAP 202 includes the same inputs and output as TAP 32 of FIG. 2. The asynchronous interfaces 204 and 206 include the same inputs and outputs as the asynchronous interface 34 of FIG. 2, except, as only one serial data return path is needed, the serial data input (SI) 72 and output for serial data (SO) 68 are not provided on asynchronous interface 206.

Registers 212 and 214 have inputs for system clock (CK) 82 connected to their respective clocks CK1 and CK2. The serial test data path can traverse the frequency domain boundary defined by CK1 and CK2 as long as it is retimed using a flip-flop controlled by TCKN as shown in FIG. 6a. This retiming flip-flop eliminates any requirement for any relationship between CK1 and CK2 since they don't directly interface.

Instead of serially concatenating the test registers clocked by CK1 and CK2, it is also possible to access each test register individually. However, the signals HN, SN and possibly TCKN would need to be generated separately from the TAP for each frequency domain. Also, a multiplexing network to select the serial output of the various test registers would need to be built. This would result in more circuitry and the addition of several long wires. The test registers can however share the two retiming flip-flops needed at the SO output and SI input of the TAP. This method can only be justified when the length of the test registers is very large and not all test registers need to be initialized or observed at a certain time.

Figure 9:
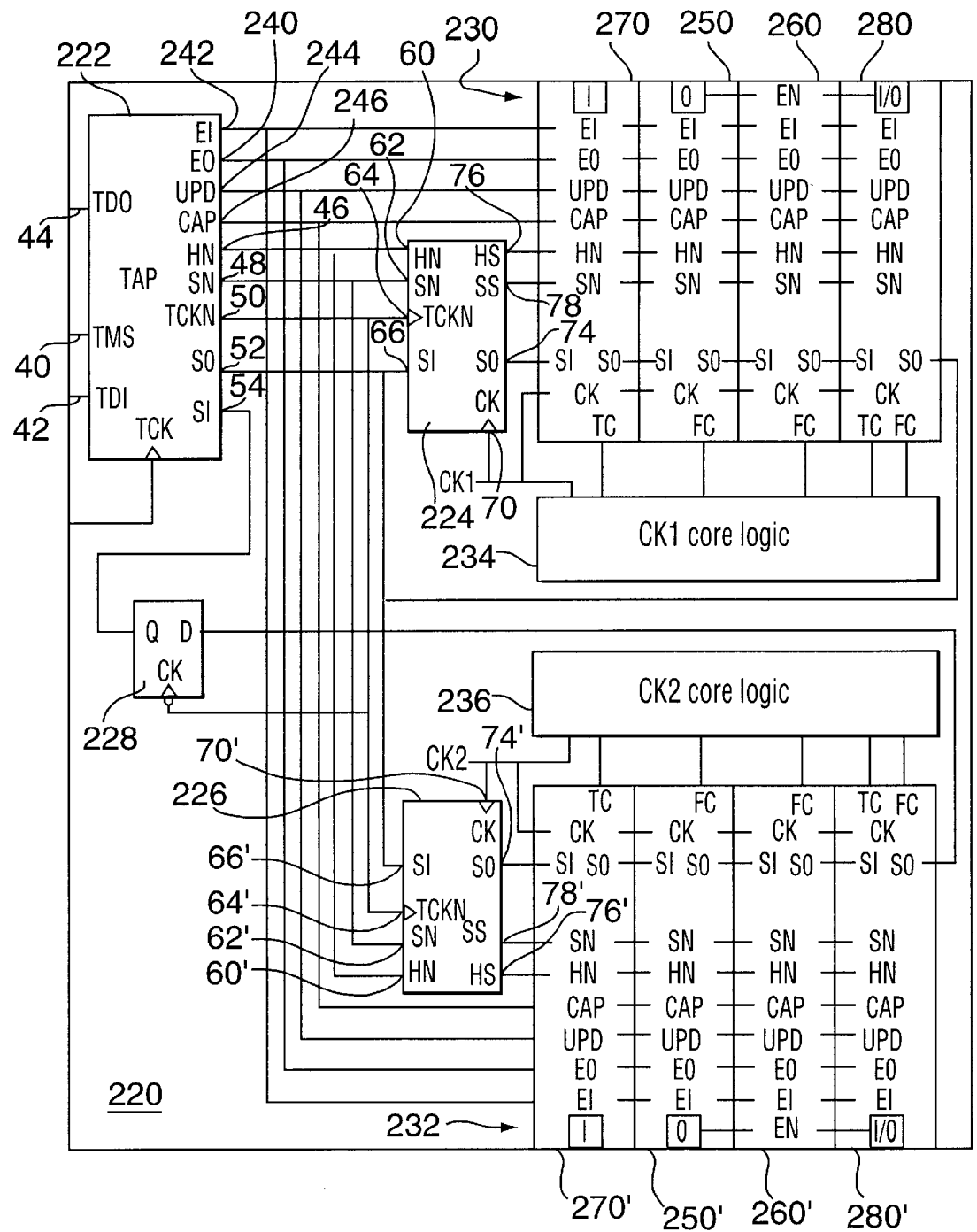
FIG. 9 illustrates in a block diagram an interface in accordance with a further embodiment of the present invention for interfacing a circuit with high-speed boundary scan.

Referring to FIG. 9, there is illustrated, in a block diagram, an interface in accordance with a further embodiment of the present invention for interfacing a circuit with high-speed boundary scan. A common case of a test register distributed over several frequency domains is a boundary scan (Bscan) test register designed to enable at-speed testing of the circuit itself while retaining compatibility with the IEEE 1149.1 standard. The boundary scan test register allows one to control and observe all pads (input, output, bidirectional) of a circuit for test purposes. The standard was defined primarily to perform a low-speed interconnect test between integrated circuits on a printed circuit board (PCB) or multi-chip module (MCM) under the control of the TAP described earlier. The clock used for Bscan is generally dedicated and unrelated to the system clock(s). When using Bscan to control and observe the inputs and outputs of the integrated circuit, the skew between the flip-flops of the Bscan chain and the core logic is such that it is often not practical to perform a high-speed test. An alternative is not to use the Bscan register during the high-speed test but a significant reduction of fault coverage might occur. The present embodiment proposes new BSCAN cells that allow performance of a high-speed test of the integrated circuit itself and of the interconnect network between integrated circuits at the next level of packaging of the circuit (eg board, MCM).

The circuit 220 includes test a test access port (TAP) 222, an asynchronous interface 224 and 226, retiming flip-flop 228, group of boundary cells 230 and 232 and core logics 234 and 236. As in the embodiment of FIG. 8, there are two clock domains CK1 and CK2. The TAP 222 includes the same inputs and outputs as the embodiments of FIGS. 2 and 8, with the addition of enable output 240 and input 242, update BSCAN output (UPD) 244, and capture BSCAN (CAP) 246. The asynchronous interface 224 and 226 is in the form of 206 of FIG. 8, the return serial data being retimed by the flip-flop 228. The boundary cells 230 and 232 include output cells 250 and 250', pad enable cells 260 and 260', input cells 270 and 270' and bidirectional cells 280 and 280', respectively. The operation of the circuit of FIG. 9 will be described in conjunction with FIGS. 10a, 10b, 10c, and 10d.

Figure 10A:
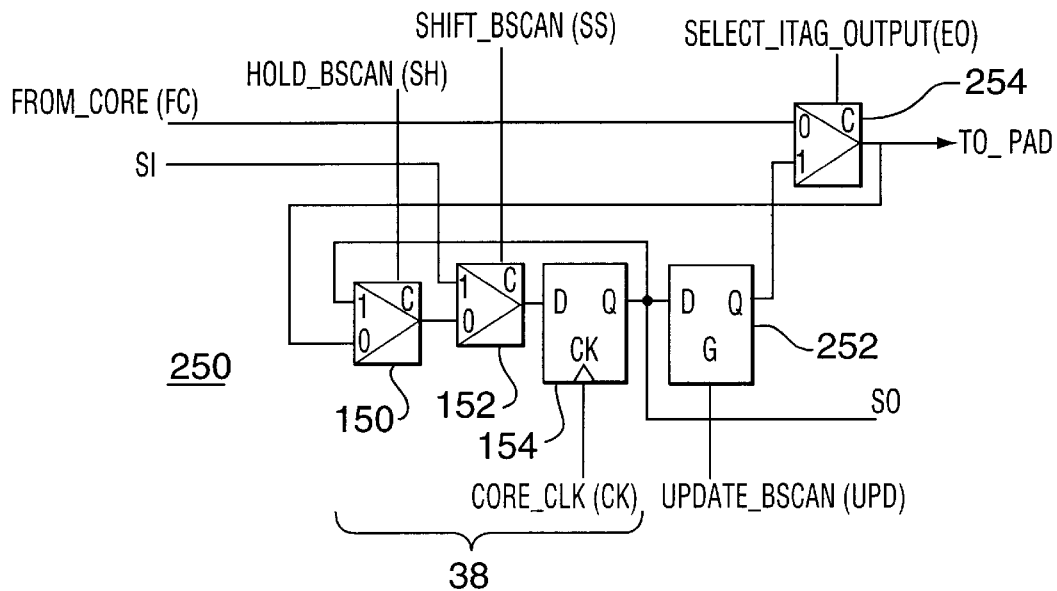
FIGS. 10a, 10b, 10c, and 10d illustrate synchronous BSCAN cells for high-speed BIST applications.
Figure 10B:
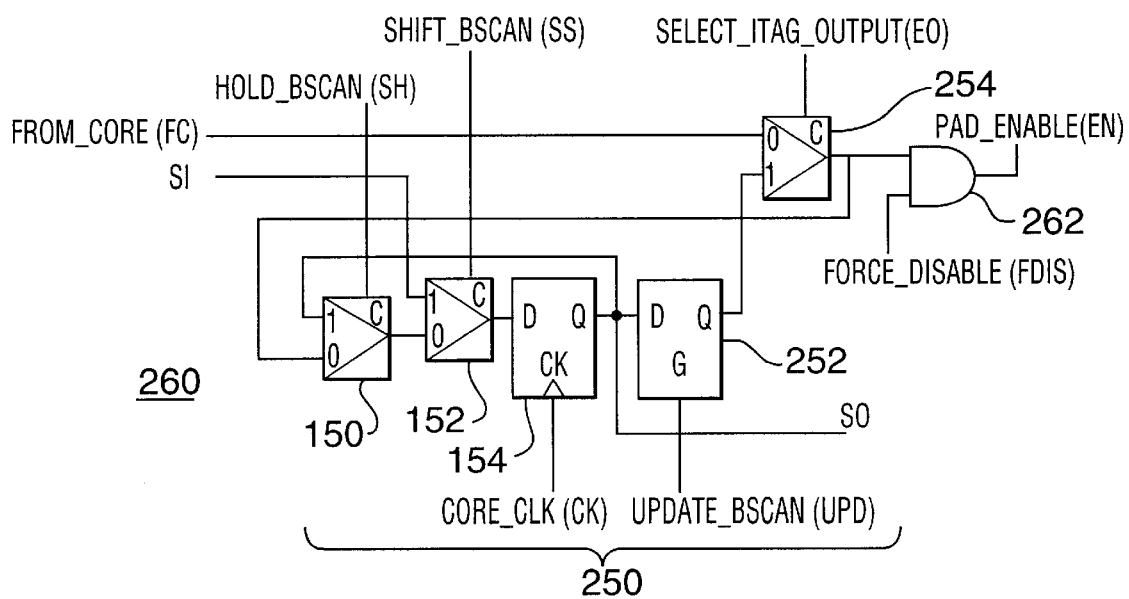
Figure 10C:
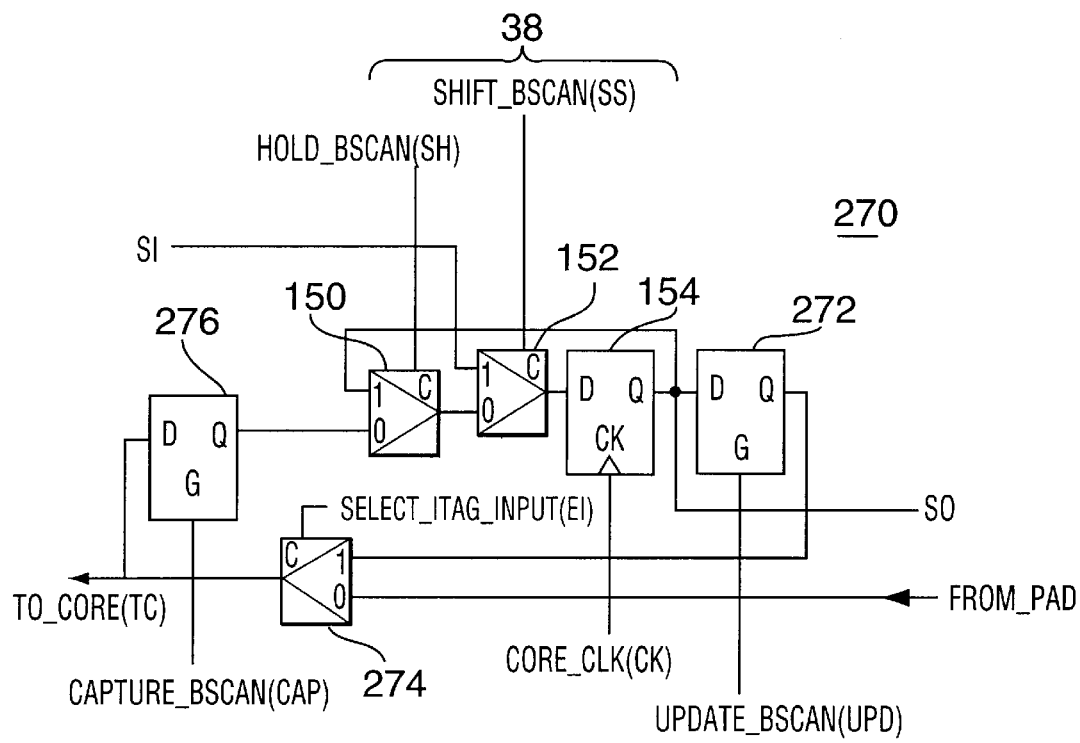

Referring to FIGS. 10a, 10b, 10c, and 10d there are illustrated synchronous BSCAN cells for high-speed BIST applications. FIGS. 10a, 10b, 10c, and d show all the types of Bscan cells used to realize the circuit of FIG. 9. All cells are built around the basic flip-flop shown in FIG. 6a (or alternatively 6b or any other equivalent design). Since the flip-flop is clocked by the core clock, the skew between the Bscan test register and the registers of the core logic is eliminated.

The output cell 250 of FIG. 10a is similar to the one proposed by the standard except for the multiplexer implementing the hold function. The output cell 250 includes the register 38 of FIG. 6a connected to a transparent latch 252 and a third multiplexer (MUX) 254. The transparent latch 252, controlled by UPDATE_BSCAN is necessary to ensure that the outputs of the integrated circuit must change consequent to the falling edge of TCK and is required for any Bscan cell design.

The pad enable cell 260 of FIG. 10b includes the same structure as the output cell 250 connected to an AND gate 262. The AND gate 262 allows disabling of an output driver controlled by the PAD_ENABLE signal.

The input cell 270 of FIG. 10c includes the register 38 of FIG. 6a connected to a transparent latch 272 and a third multiplexer (MUX) 274. The input cell 270 requires the addition of an extra latch 276, to implement the capture of the data coming from the pad consequent to the rising edge of TCK as specified by the standard in the case where the system clocks are used to clock the Bscan test register. In the case the system clocks can be replaced by TCK to perform the interconnect test at low speed, the latch is not necessary. The TAP can then generate a gated version of TCK that will cause a rising edge to occur at the Bscan flip-flop clock input to perform the capture of the data from the pad during the appropriate TAP state.

Figure 10D:
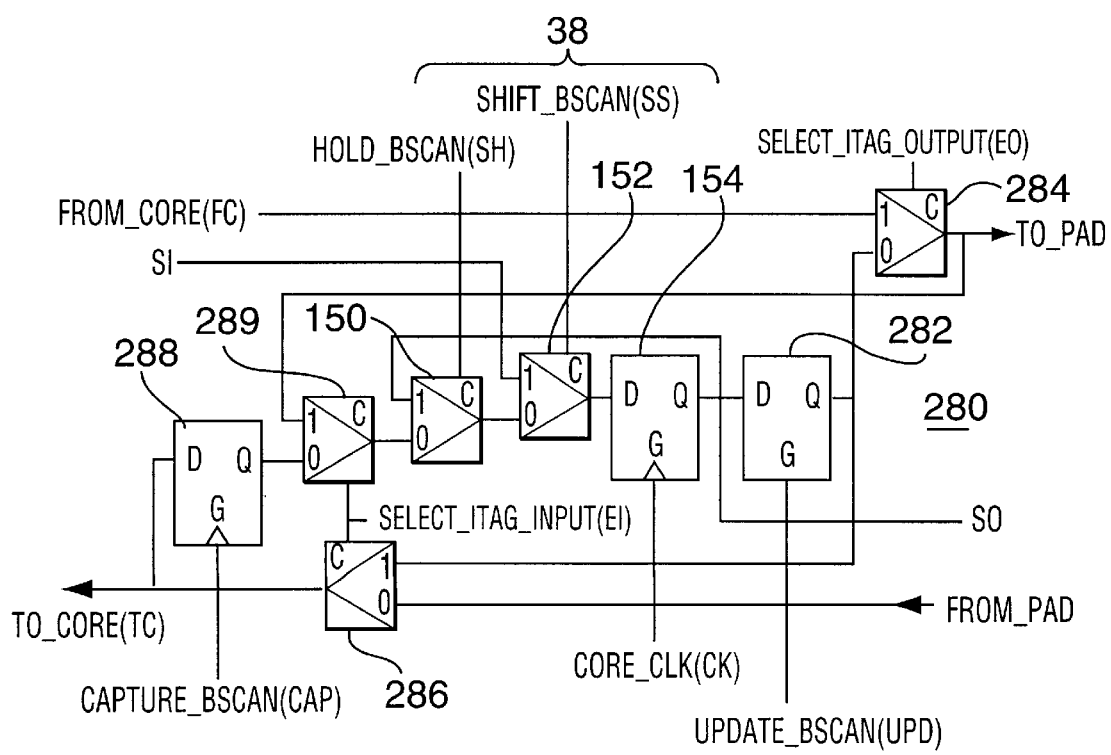

Finally, the bidirectional cell 280 of FIG. 10d combines the features of an input and output cell merged together. The register 38 plus a transparent latch 282 and MUX 284 provide the output cell portion of the bidirectional cell 280. The register 38 plus transparent latch 282, fourth MUX 286 and second transparent latch 288 provide the input cell portion of the bidirectional cell 280. A fifth MUX 289 is connected between the output of second transparent latch 288 and an input of register 38. An alternative design is to use a complete input and output cell side by side.

The operation of the complete circuit with Bscan cells shown in FIG. 9 is now described. Two clock domains are shown each connected to one input (270, 270'), one output (250, 250') and one bidirectional pad (280, 280'). The output (250, 250') and bidirectional pads (280, 280') share the pad enable cell (260, 260'). In real circuits, the number of pads is considerable. However, the present circuit 220 is sufficient to illustrate the principles involved. Several global signals (eg El, EO, UPD, CAP, FDIS) are not timing critical and are generated by the TAP for the entire circuit. The timing critical signals HS, SS and SO are generated by the asynchronous interface (224, 226).

During a high-speed test mode of the circuit itself, El=1 and EO=0 so that the inputs of the circuit are controlled from the Bscan test register and the outputs observed at the Bscan test register as well. The UPDATE_BSCAN signal is maintained to its active value (1 in this case) to enable the fast application of test vectors from the Bscan test register that is clocked using the high-speed system clocks. The value of the CAPTURE_BSCAN signal is not important but it is a good practice to keep it constant during the test to avoid spurious warnings from the simulation generated due to timing checks. Note that the signals HS, SS and SO generated by an asynchronous interface for the Bscan test register will be replaced by others generated by an on-chip test controller clocked by the corresponding system clock.

For the same value of El=1 and EO=0, a slow-speed test of the circuit can be applied using a gated version of TCK. This clock is preferably generated and applied to the core logic via a multiplexer intercepting the high-speed system clocks (CK1, CK2) so that this test can be reapplied in a complete system without having to rely on a tester to drive the system clock inputs. If not, CK1 and CK2 must be programmed on a tester to mimic the behavior of the clock normally generated by the TAP for the Bscan register. In this mode, CAPTURE_BSCAN is 1, making the capture latch in their transparent mode and UPDATE_BSCAN is generated by the TAP during the UPDATE_DR state of the TAP when the Bscan test register is selected.

During a low-speed test of the interconnect between chips, El is set to 0 and EO to 1. Either the fast system clocks CK1 and CK2 can be used or replaced with the appropriate version of TCK. In the first case though, the input and bidirectional cells absolutely need the transparent latch clocked by CAPTURE_BSCAN to capture data coming from other circuits at the time prescribed by the standard. The capture must be consequent to the rising of TCK. In the second case, the CAPTURE_BSCAN transparent latch needs to be made transparent. In both cases, the circuit will behave in a way that is compatible with the 1149.1 standard and the state diagram of FIG. 4.

With the same settings of El=0 and EO=1, it is also possible to apply a high-speed test to the interconnect between chips. The CK1 and CK2 system clocks are used. The transparent latches controlled by CAPTURE_BSCAN and UPDATE_BSCAN are made transparent. Only the circuits which have similar high-speed Bscan test registers will be able to communicate properly assuming the system clocks can be synchronized properly, most probably using phase-lock loops to reduce the skew between the clock domains of the different circuits.

When El=0 and EO=0, the system is in normal mode of operation using the system clocks CK1 and CK2. The Bscan test register can be initialized to prepare for a future test session or it can be used to capture system data values. The data can be captured using the transparent latch clocked by the CAPTURE_DR signal generated by the TAP during the CAPTURE_DR state of the state diagram. However, the data captured by different Bscan cells might not correspond to the same clock cycle of the system clocks CK1 and CK2 because of the unpredicatability of the falling edge of CAPTURE_BSCAN (causing the capture of data) with respect to those clocks. More meaningful data can be captured by making the latch clocked by CAPTURE_BSCAN transparent and by forcing SH and SS low for at least a clock cycle of the system clock CK1 or CK2 to capture the data of interest. Once a certain condition is met, the Bscan cell can then be put in hold mode using SH. Finally, the captured value can be shifted out through the asynchronous interface and the TAP for inspection.

The embodiments of the invention in which an exclusive property or privilege is claimed are defined as follows:

1. A circuit comprising an test access port in one clock domain, a test controller in a second clock domain, and an asynchronous interface for interfacing the test access port in one clock domain to the test controller in a second clock domain, the asynchronous interface comprising:

inputs for receiving a hold signal, a shift signal, a test clock signal and a system clock signal from the test access port;

outputs for providing synchronized hold signal and a synchronized shift signal to the test controller;

a first circuit connected to the inputs for receiving test and system clock signals for deriving a synchronization pulse therefrom;

a second circuit connected to the hold signal input and the output of the first circuit for deriving therefrom a synchronized hold signal and connected to the synchronized hold signal output;

a third circuit connected to the input for the shift signal and the output of the first circuit for deriving therefrom a synchronized shift signal and connected to the output for providing a synchronized shift signal; and the test controller comprising a fourth circuit connected to the synchronized hold signal output and the output for providing a synchronized shift signal, the fourth circuit for retiming serial data from the test access port in the second clock domain.

2. The circuit as claimed in claim 1 wherein the first circuit includes latches for latching the test clock signal relative to the system clock signal.

3. The circuit as claimed in claim 2 wherein the latches include three series connected D-type flip-flops.

4. The circuit as claimed in claim 3 wherein the outputs of the second flip-flop and the third flip-flop in the three series connected D-type flip-flops are gated.

5. The circuit as claimed in claim 4 wherein an AND gate is connected to the output of the third flip-flop and the output of the second flip-flop.

6. The circuit as claimed in claim 1 wherein the second circuit includes a latch with a hold function.

7. The circuit as claimed in claim 6 wherein the latch includes a D-type flip-flop with a multiplexer connected to its input.

8. The circuit as claimed in claim 1 including an input for clock mode select.

9. The circuit as claimed in claim 8 wherein the output of the second circuit is gated with the clock mode select input.

10. The circuit as claimed in claim 9 wherein the output of the second circuit is connected to an AND gate with an inverted input connected to the clock mode select input.

11. The circuit as claimed in claim 1 wherein the third circuit includes a gate.

12. The circuit as claimed in claim 11 wherein the gate includes an AND gate whose inputs are coupled to the input for the shift signal and the output for the synchronized pulse.

13. The circuit as claimed in claim 8 wherein the third circuit includes a gate.

14. The circuit as claimed in claim 13 wherein the gate includes an OR gate whose inputs are connected to the clock mode select input and the synchronization pulse output.

15. A circuit comprising a test access port, an asynchronous interface, and a test controller, the asynchronous interface comprising:

inputs for a hold signal and shift signal, a clock mode signal, a test clock signal from a test access port and a system clock signal from a system being tested;

outputs for a synchronized hold signal and a synchronized shift signal;

first, second and third D-type flip-flops series connected to the test clock input having clock inputs connected to the system clock input;

a first AND gate having an input and an inverting input, the input connected to the output of the third flip-flop, the inverting input connected between the output of the second flip-flop and the input of the third flip-flop and having an output;

a first MUX having a first input, a second input and a control input and an output connected to the input of a fourth D-type flip-flop having a clock input connected to the system clock input flip-flop the first input connected to the output of the fourth flip-flop, the second input connected to the hold signal input, the control input connected to the output of the first AND gate;

a second AND gate having an input and an inverting input and an output, the input connected to the output of the fourth flip-flop, the inverting input connected to the clock mode signal input, and the output connected to the synchronized hold signal output;

an OR gate having a first input connected to the clock mode signal input and a second input connected to the output of the first AND gate;

a third AND gate having a first input connected to the shift signal input, a second input connected to the output of the OR gate, and an output connected to the synchronized shift signal output; and the test controller comprising a fifth D-type flip-flop connected to the synchronized hold signal output and the synchronized shift signal output, the fifth D-type flip-flop for retiming serial data from the test access port in dependence upon the system clock signal.

16. A circuit comprising a test access port, an asynchronous interface connected to the test access port, a test controller connected to the asynchronous interface, the test access port is in a first clock domain and the test controller is in a second clock domain, the test controller having a register, the asynchronous interface including a first circuit for generating a synchronized hold signal and a synchronized shift signal and a second circuit for retiming serial data from the test access port in the second clock domain, the register holding or shifting its contents in dependence upon the signals from the asynchronous interface.

17. A circuit comprising:

test access port operable at a test clock rate;

an asynchronous interface connected to the test access port, the asynchronous interface including first and second circuits for generating respective synchronized hold signals and synchronized shift signals and third and fourth circuits for retiming serial data from the test access port at respective first and second system clock rates;

first and second test controllers having a register connected to respective circuits of the asynchronous interface, each test controller and respective asynchronous interface circuits operable at first and second system clock rates, the registers of the first and second test controller holding or shifting their contents in dependence upon the respective signals from the asynchronous interface; and the third circuit between the test access port and the first test controller and the fourth circuit between the test access port and the second test controller.

18. A circuit comprising:

test access port operable at a test clock rate;

an asynchronous interface connected to the test access port, the asynchronous interface including first and second circuits for generating respective synchronized hold signals and synchronized shift signals and third and fourth circuits for retiming serial data from the test access port at respective first and second system clock rates;

first and second boundary scan test registers connected to respective circuits of the asynchronous interface, registers and respective asynchronous interface circuits operable at first and second system clock rates, the first and second test boundary scan registers holding or shifting their contents in dependence upon the respective signals from the asynchronous interface; and the third circuit between the test access port and the first test controller and the fourth circuit between the test access port and the second test controller.

19. A circuit as claimed in claim 18 wherein the boundary scan test registers include an output cell.

20. A circuit as claimed in claim 18 wherein the boundary scan test registers include a pad enable cell.

21. A circuit as claimed in claim 18 wherein the boundary scan test registers include an input cell.

22. A circuit as claimed in claim 18 wherein the boundary scan test registers include a bidirectional cell.

23. The circuit as claimed in claim 19 wherein the output cell includes a register having inputs for serial data, hold, shift, and clock signals and an output for serial data; a transparent latch connected to the output of the register and having an input for an update signal and an output; and a multiplexer having inputs for a from_core signal, output from the transparent latch and a control signal and an output, the output for connection to a pad and connected to an input of the register.

24. The circuit as claimed in claim 20 wherein the pad enable cell includes a register having inputs for serial data, hold, shift, and clock signals and an output for serial data; a transparent latch connected to the output of the register and having an input for an update signal and an output; a multiplexer having inputs for a from_core signal, output from the transparent latch and a control signal and an output connected to an input of the register; and an AND gate having inputs connected to the output of the multiplexer and for a force disable signal and an output for an enable pad signal.

25. The circuit as claimed in claim 21 wherein the input cell includes a register having inputs for serial data, hold, shift, and clock signals and an output for serial data; a first transparent latch having data and capture signal inputs and an output connected to an input of the register; a second transparent latch connected to the output of the register and having an input for an update signal and an output; and a multiplexer having inputs for a from_pad signal, output from the transparent latch and a control signal and an output, the output for connection to a core and connected to an input of the first transparent latch.

26. The circuit as claimed in claim 22 wherein the bidirectional cell includes a register having inputs for serial data, hold, shift, and clock signals and an output for serial data; a first transparent latch having data and capture signal inputs and an output; a second transparent latch connected to the output of the register and having an input for an update signal and an output; a first multiplexer having inputs for a from_core signal, an output from the second transparent latch and a SELECT_JTAG OUTPUT (EO) signal and an output, the output for connection to a pad and connected to an input of the register; a second multiplexer having inputs for a from_pad signal, output from the second transparent latch and a control signal and an output, the output for connection to a core and connected to an input of the first transparent latch; and a third multiplexer having inputs connected to outputs of the first transparent latch and the first multiplexer and a control signal and an output connected to the other input of the register, the control input of second and third multiplexers for connection to an SELECT_JTAG INPUT (EI) signal.

27. An asynchronous interface for interfacing a test access port in a first clock domain to a plurality of test controllers of a system in a plurality of clock domains, said interface comprising:

a plurality of circuit s each for sampling a first clock signal at a plurality of respective clock signal transitions to obtain a respective plurality of s ampled first clock signals;

a plurality of circuits each for deriving a synchronization pulse from two of the respective plurality of sampled first clock signals;

a plurality of circuits for synchronizing hold and shift signals from the test access port in dependence upon respective synchronization pulses; and a plurality of circuits for retiming serial data from the test access port between each of the plurality of clock domains.

28. An apparatus comprising a test access port in a first clock domain connected to an asynchronous interface connected to a test controller of a system in a second clock domain, the asynchronous interface for interfacing the test access port in a first clock domain to the test controller of a system in a second clock domain, said asynchronous interface comprising:

a circuit for sampling a first clock signal at a plurality of second clock signal transitions to obtain a plurality of sampled first clock signals;

a circuit for deriving a synchronization pulse from two of the plurality of sampled first clock signals;

a circuit for synchronizing hold and shift signals from the test access port in dependence upon the synchronization pulse; and the test controller comprising a circuit for retiming serial data from the test access port in dependence in the second clock domain.

29. An asynchronous interface for use in serially transferring digital data at a first clock rate from a first clock domain to a second clock domain clocked by a system clock signal having a system clock rate which is at least three times said first clock rate, said second clock domain having a domain serial data input, a domain serial data output, and memory elements clocked by said system clock, each memory element having a serial data input and a serial data output, said memory element serial data inputs and outputs being connected in series between said domain serial data input and serial data output, each said element being responsive to a first combination of control signals for configuring in a hold mode and responsive to a second combination of control signals for configuring in shift mode for shifting the data at their serial data input to their serial data output, said interface comprising:

a retiming circuit clocked by said first clock signal for shifting serial data consequent to each of a predetermined transition of said first clock signal and applying retimed serial data to said domain serial data input of said second domain;

a circuit for sampling said first clock signal at said system clock rate and generating a synchronization pulse consequent to each said predetermined transition of said first clock; and a circuit responsive to said synchronization pulse for generating synchronized control signals, said circuit generating said second combination of control signals while said synchronization pulse is active and otherwise generating said first combination of control signals.

30. An asynchronous interface as defined in claim 29, said circuit for generating a synchronization pulse being operable to initiate said synchronization pulse consequent to the second active system clock transition following said predetermined transition of said first clock signal and to terminate said synchronization pulse consequent to the third active system clock transition following said predetermined transition of said first clock signal.

31. An asynchronous interface as defined in claim 29, said circuit for generating synchronized control signals being further responsive to said synchronization pulse for sampling asynchronous control signals output from said first clock domain and generating corresponding synchronized control signals.

32. An asynchronous interface as defined in claim 29, further including a second retiming circuit clocked by said first clock signal for receiving serial data from said domain serial data output consequent to said predetermined transitions of said first clock signal and applying retimed serial data to a return serial data input of said first clock domain.

33. An asynchronous interface for use in serially transferring digital data at a first clock rate from a first clock domain to a second clock domain clocked by a system clock having a system clock rate which is at least three times said first clock rate, said second clock domain having a domain serial data input, a domain serial data output, and memory elements clocked by said system clock, each memory element having a serial data input and a serial data output, said memory element serial data inputs and outputs being connected in series between said domain serial data input and serial data output, each said memory element being responsive to a first combination of hold and shift signals for configuring in a hold mode for holding their contents and responsive to a second combination of hold and shift signals for configuring in a shift mode for shifting the data from their serial data input to their serial data outputs, said interface comprising:

a first retiming circuit clocked by said first clock signal for receiving serial data consequent to a predetermined transition of said first clock signal and applying retimed serial data to said domain serial data input of said second domain;

a circuit for sampling said first clock signal at said system clock rate and generating a synchronization pulse consequent to each said predetermined transition of said first clock;

a circuit responsive to asynchronous hold and shift signals generated consequent to said predetermined transition and said synchronization pulse for generating said second combination of hold and shift signals during active synchronization pulses and for generating said first combination of hold and shift signals between active synchronization pulses; and a second retiming circuit clocked by said first clock signal for receiving serial data from said domain serial data output consequent to predetermined transitions of said first clock signal and applying retimed serial data to a return serial data input of said first clock domain.

34. An asynchronous interface as defined in claim 33, said circuit for generating a synchronization pulse being operable to initiate said synchronization pulse consequent to the second active system clock transition following said predetermined transition of said first clock signal and to terminate said synchronization pulse consequent to the third active system clock transition following said predetermined transition of said first clock signal.

35. An asynchronous interface as defined in claim 33, said response circuit including a circuit for generating a synchronized hold signal including a d-type flip-flop clocked by said system clock and having an output for said synchronized hold signal; a multiplexer for receiving said asynchronous hold signal and the output of said flip-flop and a control input for receiving said synchronization pulse and applying said asynchronous hold signal to the input of said flip-flop when said synchronization signal is active.

36. An asynchronous interface as defined in claim 33, said responsive circuit including a circuit for generating a synchronized shift signal including an and gate for receiving said asynchronous shift signal and said synchronization signal and generating said synchronous shift signal while said synchronization signal is active.

37. An asynchronous interface as defined in claim 33, said sampling circuit including:

first, second and third serially connected d-type flip-flops, each clocked by said system clock for detecting each falling edge transition of said first clock signal, said first flip-flop receiving said front clock signal, said second flip-flop receiving the output of said first flip-flop and producing an output signal representative of the state of said first clock signal, said third flip-flop receiving said state representative output signal and producing a third output signal, and an and gate for receiving said third output signal and an inverted state representative signal and producing said synchronization pulse.

38. An asynchronous interface as defined in claim 33, said circuit for generating a synchronized hold signal including a d-type flip-flop clocked by said system clock and having an output for said synchronized hold signal, a multiplexer for receiving said asynchronous hold signal and said synchronized hold signal and a control input for receiving said synchronization pulse and applying said asynchronous hold signal to the input of said flip-flop when said synchronization signal is active;

said synchronized shift signal generating circuit including an and gate for receiving said asynchronous shift signal and said synchronization signal and generating said asynchronous shift signal when said synchronization signal is active; and said sampling circuit including first, second and third serially connected d-type flip-flops, each clocked by said system clock, for detecting each falling edge transition of said first clock signal, said first flip-flop receiving said first clock signal, said second flip-flop receiving the output of said first flip-flop and producing an output signal representative of the state of said first clock signal, said third flip-flop receiving said state representative output signal and producing a third output signal, and an and gate for receiving said third output signal and an inverted state representative signal and producing said synchronization pulse.

39. A circuit for serially transferring digital data at a first clock rate into a clock domain clocked by a system clock signal having a system clock rate in which said system clock rate is at least three times greater than said first clock rate, said second clock domain having memory elements clocked by said second clock signal and being responsive to predetermined control signals for either retaining their data or for shifting data from respective serial data inputs to respective serial data outputs, said serial data inputs and outputs of said elements being connected in series to permit data to be shifted therethrough when configured in a shift mode, said circuit comprising:

a circuit clocked by said first clock signal for receiving and outputting, consequent to each of a predetermined transition of said first clock signal, said serial data to a serial data input of said memory elements;

a circuit for generating asynchronous control signals consequent to each said predetermined transition of said first clock signal;

an asynchronous interface clocked by said second clock signal and responsive to each said predetermined transition of said first clock signal and said asynchronous control signals for generating synchronized control signals and applying said synchronized control signals to corresponding control signal inputs of each said memory elements for configuring said elements in a shift mode for one system clock cycle consequent to each said predetermined transition of said first clock signal and otherwise in a hold mode.

40. A circuit as defined in claim 39, said asynchronous interface further including a second retiming circuit clocked by said first clock signal for retiming data serially shifted out of said memory elements back to said first clock domain.

41. A circuit as defined in claim 39, said control signals being hold and shift signals, said asynchronous control signals including asynchronous hold and shift signals, said asynchronous interface including:

a synchronizing signal generating circuit for generating a synchronizing signal, said synchronizing signal generating circuit being clocked by said second clock signal and being responsive to each said predetermined transition of said first clock signal for inserting a synchronization pulse into said synchronizing signal;

a synchronized hold signal generating circuit responsive to said asynchronous hold signal and said synchronization pulse for inserting a synchronized hold pulse in said synchronized hold signal and applying said synchronized hold signal to a hold signal input of each said memory elements;

a synchronized shift signal generating circuit responsive to said asynchronous shift signal and said synchronization pulse for inserting a synchronized shift pulse in said synchronized shift signal and applying said synchronized hold signal to a shift signal input of each said memory elements;

said memory elements being responsive to a first predetermined combination of said synchronized hold and synchronized shift signals for shifting data applied to said serial data input and responsive to a second combination of said synchronized hold and synchronized shift signals for holding their respective contents.

42. An integrated circuit having a test access port including a test data input, a test data output, a test clock input and a test mode select input, said integrated circuit being IEEE 1149.1 compliant, said circuit having core logic clocked at a system clock rate, and at least one shift register having a plurality of shift register elements, an improvement for serially transferring data into and out of said at least one register at said test clock rate while operating said core logic and said at least one register at said system clock rate, each said shift register elements having a serial data input, a serial data output, a hold input, a shift input and a clock input clocked by said system clock, said improvement comprising:

an asynchronous interface clocked by said system clock signal and responsive to said test clock signal for generating synchronized shift and hold signals and applying said shift and hold signals to said shift register for configuring said shift register elements in a shift mode for one system clock cycle consequent to a predetermined transition of said test clock signal and otherwise in a hold mode until the next predetermined transition of said first clock signal;

each said shift register elements being responsive to a first predetermined combination of said hold and shift signals for shifting data applied to said serial data input and to a second combination of said hold and shift signals for holding their respective contents.

43. A circuit as defined in claim 42, said asynchronous interface including a first timing circuit clocked by said test clock signal for retiming, consequent to each of a predetermined transition of said test clock signal, serial data output by said test access port and applying retimed serial data to said serial data input of said at least one register.

44. A circuit as defined in claim 43, said asynchronous interface including a second timing circuit clocked by said test clock signal for retiming, consequent to each said predetermined transition of said test clock signal, serial data output by said register and applying retimed serial data to said test access port.

45. An integrated circuit having a test access port including a test data input, a test data output, a test clock input and a test mode select input, said integrated circuit being IEEE 1149.1 compliant, said integrated circuit having core logic clocked at a system clock rate, and a boundary scan register, an improvement for permitting shifting of data into and out of said register at said test clock rate while operating said core logic and said register at said system clock rate, said register including a plurality of boundary scan cells having a serial data input, a serial data output, a hold input, a shift input, and a clock input clocked by said system clock, said improvement comprising:

an asynchronous interface clocked by said system clock signal and responsive to said test clock signal for generating synchronized shift and hold signals and applying said shift and hold signals to said boundary scan cells for configuring said boundary scan cells in a shift mode for one system clock cycle consequent to a predetermined transition of said test clock signal and in a hold mode until the next predetermined transition of said first clock signal;

each said boundary scan cell being responsive to a first predetermined combination of said hold and shift signals for shifting data applied to said serial data input and to a second combination of said hold and shift signals for holding their respective contents.

46. A circuit as defined in claim 45, said asynchronous interface including a first timing circuit clocked by said test clock signal for retiming, consequent to a predetermined transition of said test clock signal, serial data output by said test access port and applying retimed serial data to said serial data input of said boundary scan cells.

47. A circuit as defined in claim 46, said asynchronous interface including a second timing circuit clocked by said system clock signal for retiming, consequent to each said predetermined transition of said test clock signal, serial data output by said boundary scan register and applying retimed serial data to said test access port.

48. A method of serially transferring digital data from a first clock domain clocked by a first clock signal having a first clock rate to a second clock domain clocked by a second clock signal having a second clock rate which is at least three times greater than said first clock rate, said second clock domain having memory elements clocked by said second clock signal, each of said memory elements having a serial data input and a serial data output and being configurable in hold mode in response to a first combination of control signals for holding outputs of said memory elements constant and in a shift mode in response to a second combination of control signals for shifting data at said serial data input to said serial data output, said serial data inputs and serial data outputs of said memory elements being connected in series during said shift mode to permit data to be shifted through said memory elements, said method comprising the steps of:

clocking digital data consequent to each of a predetermined transition of said first clock signal from said first clock domain into a serial data input of said serially connected memory elements; and consequent to each predetermined transition of said first clock signal, configuring said memory elements in said shift mode for a duration of one cycle of said second clock signal, and in said hold mode until the next predetermined transition of sad first clock signal.

49. A method as defined in claim 48, said step of configuring said memory elements including the steps of:

detecting each said predetermined transition of said first clock signal;

generating an active synchronization pulse, having a width of one system clock cycle, consequent to each said detected predetermined transition of said first clock signal and inhibiting the generation of a synchronization pulse until the next predetermined transition of said first clock; and during each active synchronization pulse, generating said second combination of control signals required to place said memory elements in shift mode and applying said control signals to said memory elements and, otherwise generating said first combination of control signals required to place said memory elements in hold mode and applying said control signals to said memory elements.

50. A method as defined in claim 49, further including the step of generating asynchronous control signals consequent to each said predetermined transition of said first clock signal, said step of generating said combinations of control signals including sampling said asynchronous control signals during active synchronization pulses and generating corresponding synchronized control signals and applying said synchronized control signals to said memory elements.

51. A method as defined in claim 49, further including the step of, consequent to each said predetermined transition of said first clock signal, generating asynchronous control signals for configuring said memory elements in a shift, hold, or capture mode, said step of generating said combinations of control signals including sampling said asynchronous control signals during active synchronization pulses and generating corresponding synchronized control signals and applying said synchronized control signals to said memory elements.

52. A method as defined in claim 48, further including the step of transferring data out of said second clock domain and into said first clock domain, including the step of retiming data being shifted out at said first clock rate.

53. A method of serially transferring digital data from a first clock domain clocked by a first clock signal having a first clock rate to a second clock domain clocked by a second clock signal having a second clock rate which is at least three times greater than said first clock rate, said second clock domain having memory elements clocked by said second clock signal, each of said memory elements having a serial data input and a serial data output and being configurable in hold mode in response to a first combination of hold and shift signals for holding the outputs of said memory elements constant and in a shift mode in response to a second combination of hold and shift signals for shifting data at said serial data inputs to said serial data outputs in each of said memory elements, said serial data inputs and serial data outputs of said memory elements being connected in series during said shift mode to permit data to be shifted through said elements, said method comprising the steps of:

clocking digital data consequent to each of a predetermined transition of said first clock signal from said first clock domain into a serial data input of said serially connected memory elements; and consequent to said predetermined transition of said first clock signal, configuring said memory elements in said shift mode for a duration of one cycle of said second clock signal and in said hold mode until the next predetermined transition of said first clock signal.

54. A method as defined in claim 53, said step of configuring said memory elements including the steps of:

detecting each said predetermined transition of said first clock signal;

generating a synchronization pulse having a pulse width of one system clock cycle consequent to each detected predetermined transition and an inactive synchronization pulse until the next predetermined transition of said first clock signal; and during each active synchronization pulse, generating said second combination of shift and hold signals required to place said memory elements in shift mode and applying said shift and hold signals to said memory elements and, during said inactive synchronization pulse, generating said first combination of shift and hold signals required to place said memory elements in hold mode and applying said shift and hold signals to said memory elements.

55. A method as defined in claim 54, further including the step of generating asynchronous shift and hold signals consequent to said predetermined transition of said first clock signal, said step of generating said combinations of shift and hold signals including sampling said asynchronous shift and hold signals during said synchronization pulse and generating corresponding synchronized shift and hold signals and applying said synchronized shift and hold signals to said memory elements.

56. A method as defined in claim 55, further including the step of transferring data out of said second clock domain to said first clock domain, including the step of retiming data being shifted out at said first clock rate.

57. A method of serially transferring digital data from a first clock domain clocked by first clock signal having a first clock rate to a second clock domain clocked by a second clock signal having a second clock rate which is at least three times greater than said first clock rate, said second clock domain having memory elements clocked by said second clock signal, each of said memory elements having a serial data input and a serial data output and being configurable in hold mode in response to a first combination of hold and shift signals for holding their outputs constant and in a shift mode in response to a second combination of hold and shift signals for shifting data at said serial data input to said serial data output, said serial data inputs and outputs of said memory elements being connected in series during said shift mode to permit data to be shifted through said memory elements, said method comprising the steps of:

clocking digital data consequent to each of a predetermined transition of said first clock rate from said first clock domain into a serial data input of said serially connected memory elements in second clock domain;

generating asynchronous shift and hold signals consequent to each said predetermined transition of said first clock signal;

consequent to each said predetermined transition of said first clock signal configuring said memory elements in shift mode for a duration of one cycle of said second clock signal and in hold mode until the next predetermined transition of said first clock signal, said step of configuring said memory elements including the steps of detecting each said predetermined transition of said first clock signal, generating an active synchronization pulse having a pulse width of one system clock cycle consequent to each detected predetermined transition, and generating an inactive synchronization pulse thereafter until the next predetermined transition of said first clock signal, and, during each active synchronization pulse, generating said second combination of shift and hold signals required to place said memory elements in shift mode and, during an inactive synchronization pulse, generating said first combination of shift and hold pulses required to place said memory elements in hold mode, said steps of generating said combinations of shift and hold signals including sampling said asynchronous shift and hold signals and producing corresponding synchronized shift and hold signals and applying said synchronized shift and hold signals to said memory elements.

58. A method as defined in claim 57, further including the step of transferring data out of said second clock domain to said first clock domain, including the step of retiming data being shifted out at said first clock rate.

59. A method as defined in claim 57, further including the step of transferring data out of said second clock domain and into other clock domains docked by a different clock signal having a different clock rate which is at least three times greater than said first clock rate, including the steps of retiming, at said first clock rate, data being shifted out.

60. A method as defined in claim 57, said step of configuring said memory elements in hold mode including generating an asynchronous hold signal and applying said asynchronous hold signal to the clock enable input of said memory elements.

61. A method of scanning data into and out of an IEEE 1149.1 compliant integrated circuit using a test clock signal having a test clock rate while operating said circuit at a system clock rate, said circuit having a test access port including a test data input, a test data output, and at least one shift register, said register having a plurality of memory elements clocked at said system clock rate and having a serial data input, a serial data output, a control signal input for configuring in a hold mode in response to a first combination of control signals and in a shift mode in response to a second combination of control signals for shifting data at said serial data input to said serial data output, said serial data inputs and serial data outputs of said memory elements being connected in series during shift mode to permit data to be shifted through said memory elements of said at least one shift register, said method comprising the steps of:

applying test data to said test data input at a test clock rate which is one third or less than said system clock rate;

retiming said test data consequent to each of a predetermined transition of said test clock signal into said register;

consequent to said predetermined transition of said test clock signal during scan in, and scan out operations, configuring said memory elements in shift mode for one cycle of said system clock and in hold mode until the next predetermined transition of said test clock signal;

retiming, at said test clock rate, data scanned out of said register prior to returning said data to said test access port; and applying the retimed data to said test data output.

62. A method of scanning data into and out of an IEEE 1149.1 compliant integrated circuit at a test clock rate while operating said circuit at a system clock rate, said circuit having a test access port including a test data input, a test data output, a boundary scan register at the boundary of said circuit, said boundary scan register having a plurality of boundary scan cells each having a shift register element clocked at said system clock rate and having a scan input, a scan output, a hold signal input and a shift signal input for configuring said shift register element in a hold mode in response to a first combination of hold and shift signals and in a shift mode in response to a second combination of hold and shift signals for shifting data at said scan input to said scan output, said scan inputs and outputs of said shift register elements being connected in series between said test data inputs and outputs during shift mode to permit data to be shifted through said boundary scan register, said method comprising the steps of:

connecting said serial data inputs and outputs of said boundary scan cells in series between said test data input and test data output;

applying test data to said test data input at a clock rate which is one third or less than said system clock rate;

retiming said test data on each of a predetermined transition of said test clock rate into said boundary scan register;

consequent to said predetermined transition of said test clock signal of scan in and scan out operations, configuring said boundary scan cell registers in shift mode for one cycle of said system clock and in hold mode until the next predetermined transition of said first clock signal;

retiming, at said test clock rate, data scanned out of said boundary scan register prior to returning said data to said test access port; and applying the retimed data to said test data output.

63. A method of scanning data into and out of an IEEE 1149.1 compliant integrated circuit using a test clock signal having a test clock rate while operating said circuit in its normal mode of operation, said circuit having a test access port (tap) including a test data input, a test data output, a serial data output, a serial data input, and at least two shift registers, each said shift registers having a plurality of memory elements clocked at their respective system clock rate and having a serial data input, a serial data output, control signal inputs for configuring said elements in a hold mode in response to a first combination of control signals and in a shift mode in response to a second combination of control signals for shifting data at their serial data input to their serial data output, said method comprising the steps of:

selecting one of more of said at least two shift registers and connecting selected shift registers in series between said tap serial data output and said tap serial data input of said circuit, and connecting said test data input to said tap serial data output and said tap serial data input to said tap test data output so as to define a scan path containing said selected shift registers;

applying test data to said test data input at a test clock rate which is one third or less than any of said system clock rates;

for each shift register of said selected registers:
  retiming data applied to the shift register serial data input consequent to each of a predetermined transition of said test clock signal; consequent to each said predetermined transition of said test clock signal during scan in and scan out operations, configuring said memory elements in shift mode for one cycle of its respective system clock and thereafter in hold mode until the next predetermined transition of said test clock signal;

retiming, at said test clock rate, data scanned out of the last shift register in the scan chain prior to applying said data to said serial data input of said test access port; and applying the retimed data to said test data output.

64. A method as defined in claim 63, said step of configuring said memory elements including the steps of:

detecting each said predetermined transition of said first clock signal;

generating a synchronization pulse having a pulse width of one system clock cycle consequent to each detected predetermined transition and an inactive synchronization pulse until the next predetermined transition of said first clock signal; and during each active synchronization pulse, generating said second combination of control signals required to place said memory elements in shift mode and applying said control signals to said memory elements and, during said inactive synchronization pulse, generating said first combination of control signals required to place said memory elements in hold mode and applying said control signals to said memory elements.

65. A method as defined in claim 64, further including the step of, for each shift register of said selected shift registers, generating asynchronous control signals consequent to each said predetermined transition of said test clock signal, said step of generating said combinations of control signals including sampling each said asynchronous control signals during said synchronization pulse and generating corresponding synchronized control signals and applying said synchronized control signals to the memory elements of said each shift registers.

66. A method as defined in claim 64, said control signals being shift and hold signals.

67. A method as defined in claim 64, further including the step of, at the end of a scan in process, generating an asynchronous capture control signal consequent to a predetermined transition of said test clock, synchronizing said asynchronous capture control signal at each shift register of said selected shift registers, and applying the synchronized capture signal to each memory element for capturing the output of each memory element in each shift register of said selected shift registers.

* * * * *

UNITED STATES PATENT AND TRADEMARK OFFICE
CERTIFICATE OF CORRECTION

PATENT NO.   : 5,900,753
ISSUE DATE   : May 4, 1999
INVENTORS    : Cote, Jean-Francois; Nadeau-Dostie, Benoit It is certified that error appears in the above-identified patent and that said Letters Patent is hereby corrected as shown below:

Col. 3, line 20,   Substitute "12" for "17" after "module".
Col. 3, line 34,   Delete "," after "clock".
Col. 4, line 50,   Substitute "Pause_Dr," for "Pause Dr" after "EXIT1_Dr,".
Col. 6, line 59,   Delete "$t_{hold \rightarrow tr}$" and add --$t_{hold\_tr}$-- after "is".
Col. 7, line 20,   Delete "$(2*t_{period\_CK\text{-}tsetup\_tr})$ and add --$(2*t_{setup\_CK} - t_{setup\_tr}) < t_{TCKN \rightarrow INPUTS}$,-- after "that".
Col. 8, line 38,   Delete "test" first occurrence after "includes".
Col. 8, line 55,   Delete "d" after "and" and add --10d--.
Col. 10, line 46,  Delete "an" and add --a-- after "comprising".
Col. 13, line 57,  Delete "circuit s" and add --circuits-- after "of".
Col. 15, line 64,  Delete "and" and add --AND-- after "an".
Col. 16, line 11,  Delete "and" second occurrence, and add --AND-- after "an".
Col. 16, line 25,  Delete "and" and add --AND-- after "an".
Col. 16, line 39,  Delete "and" second occurrence, and add --AND--.

Signed and Sealed this

Twenty-fourth Day of April, 2001

NICHOLAS P. GODICI

Attest:

Attesting Officer

Acting Director of the United States Patent and Trademark Office